United States Patent [19]

Bartram

[11] 4,197,223
[45] Apr. 8, 1980

[54] ASBESTOS FREE FRICTION MATERIALS

[75] Inventor: David T. Bartram, Stockport, England

[73] Assignee: Ferodo Limited, Manchester, England

[21] Appl. No.: 930,185

[22] Filed: Aug. 1, 1978

[30] Foreign Application Priority Data

Aug. 10, 1977 [GB] United Kingdom ............... 33483/77

[51] Int. Cl.² .............................................. C08L 1/02
[52] U.S. Cl. ............................... 260/17.2; 188/251 R; 188/251 A; 188/199; 260/17.4 CL; 260/17.4 BB
[58] Field of Search ......................................... 260/17.2

[56] References Cited

U.S. PATENT DOCUMENTS

| | | | |
|---|---|---|---|
| 3,007,890 | 11/1961 | Twiss et al. | 260/38 |
| 3,684,062 | 8/1972 | Johnson | 188/251 R |
| 3,922,241 | 11/1975 | Barker et al. | 260/17.2 |
| 3,956,545 | 5/1946 | Afflerbach | 428/37 |
| 3,959,194 | 5/1976 | Adelmann | 188/251 A |
| 3,967,037 | 6/1976 | Marzocchi et al. | 428/392 |
| 4,051,097 | 9/1977 | Aldrich | 260/38 |
| 4,119,591 | 10/1978 | Aldrich | 260/17.2 |

FOREIGN PATENT DOCUMENTS 1780271  9/1971  Fed. Rep. of Germany .......... 260/17.2

Primary Examiner—Edward M. Woodberry
Attorney, Agent, or Firm—Cushman, Darby & Cushman

[57] ABSTRACT

The invention concerns a composition for a friction material, e.g. for a clutch facing, of the type containing a fibrous reinforcement, a binder and various additives.

The composition contains a thermoset binder, the binder making up 15 to 40% by volume of the material.

The fibrous reinforcement is a mixture of inorganic and organic fibres which makes up about 70 to 33% by volume of the material. The inorganic fibre is selected from metal fibres, glass fibre, mineral wools, silica fibres and ceramic fibres. The organic fibre can be wood pulp, jute, sisal, cotton.

14 Claims, No Drawings

ASBESTOS FREE FRICTION MATERIALS

This invention relates to friction materials, and more particularly to friction materials of the kind used for clutch linings, brake linings and similar uses.

Friction materials of this kind are generally composed of a thermoset binder, a fibrous reinforcement, generally asbestos, and various fillers and other additives. Proposals have been made regarding the replacement of asbestos with other materials but without complete success owing to the severe operating temperatures and pressures which the materials are required to withstand under repeated application without failure or deterioration in friction properties.

According to the present invention a friction material comprises a thermoset binder, a fibrous reinforcement and other fillers and additives, the thermoset binder making up 15 to 40 percent by volume of the material, and the fibrous reinforcement making up 70 to about 33 percent by volume of the material the fibrous reinforcement comprising a mixture of at least one inorganic fibrous material selected from metal fibres; glass fibre; mineral wools manufactured from slags or naturally occurring rocks such as basalt; silica fibres and ceramic fibres of the alumino-silicate type; with at least one organic fibrous material.

Preferably the fibrous reinforcement constitutes about 33 to 50 percent by volume of the friction material.

The preferred amount of inorganic fibrous material is in the range 20 to 40 percent by volume of the material, and the preferred amount of organic fibrous material is in the range 3 to 20 percent by volume of the material.

In general when the inorganic fibrous material is in the form of metal fibres such as steel fibre its amount will preferably be in the lower end of the preferred range. The preferred inorganic fibrous materials are glassy inorganic fibres such as glass fibres, mineral wools, alumino-silicate fibres etc., particularly glass fibres.

The organic fibrous material consists of short lengths of fibre and may comprise cellulose fibres from sources such as wood pulp, jute, sisal, or cotton linters. A function of the organic fibrous material is to convey integrity and green strength to the material during production, and to this end the organic fibres must be opened fibre, when natural products are used. Thus wood pulp is a suitable organic fibrous material whilst wood flour is not since the fibres of the wood are bound tightly by resin and wood flour acts only as a filler.

The inorganic fibrous material is also in the form of short lengths of fibre and is the main reinforcement of the friction material. Where mineral wool is being used as the inorganic reinforcement it is preferred that it contains a minimum of the small non-fibrous agglomerates of mineral usually referred to as shot. Where it is desired to use large quantities of glass fibres in a particular formulation it is advantageous to use milled glass fibres or chopped strand glass i.e. glass in the form of continuous bundles of fine glass filaments, bound together with coatings of sizes commonly used by the glass fibre industry, then chopped into short strands composed of a multitude of fine parallel filaments. The preferred chopped strand length is 3 to 13 mm. However, shorter fibres may be used if desired. It is also desirable to use glass whose individual filaments are coated with a coupling agent applied during the manufacturing process to improve the bond between the glass and the thermoset binder.

The preferred metal fibre is steel fibre, which may be mild steel and is preferably in the form of short lengths of fine steel fibre e.g. diameter of the order of 0.125 mm. and length in the range 1 to 5 mm.

In the friction material the binder is preferably an organic binder, for example a thermosetting resin such as a phenol-formaldehyde resin, or a heat and chemical resistant natural or synthetic rubber such as nitrile rubber.

Preferably the binder comprises a phenol-formaldehyde resin, and more preferably a mixture of such a resin with a heat and chemical resistant cured rubber such as nitrile rubber.

The other fillers and additives in the friction material may be taken from a number of classes of such materials, and the nature and amount of each such material is chosen to achieve the particular desired cost/property combination. Inorganic particulate fillers such as barytes, whiting, rottenstone; reinforcing fillers such as mica; friction and wear modifiers including lubricants such as graphite or molybdenum disulphide; antimony trisulphide, metals such as copper, zinc, brass or aluminium in the form of wires, turnings or particles may each be incorporated as desired. Friction dusts or particles composed of cured and ground thermoset resins or rubbers may also be added.

The friction material of this invention is particularly suitable for manufacture by a slurry technique in which the fibres, binder and other ingredients are dispersed in water by means of a beater to form a pulp. The pulp is then formed into a sheet by deposition on a wire screen or felt and the water sucked out. The sheet is then dried, cut into desired shapes and cured by application of heat and pressure. This technique is particularly suited to the manufacture of clutch facings.

The invention will now be illustrated in the following Examples.

EXAMPLES 1 to 3

Annular clutch facings of outside diameter 152.4 mm and inside diameter 127 mm were manufactured by the slurry technique mentioned above from friction materials having the formulations given in Table I below, all quantities being given as parts by volume.

TABLE I

| Example No. | 1 | 2 | 3 |
|---|---|---|---|
| Binder | | | |
| Phenol-formaldehyde resin | 25 | 26 | 26 |
| Fibrous materials | | | |
| Glass Fibres (3mm-6mm) | 40 | 25 | — |
| Kaowool (Alumino-silicate fibre)* | — | — | 30 |
| Cellulose (wood pulp) | 20 | 10 | 5 |
| Fillers etc. | | | |
| Friction dust | — | 17 | 17 |
| Whiting | 12 | 14 | 14 |
| Antimony sulphide | — | 5 | 5 |
| Brass | 3 | 3 | 3 |

*Kaowool is commercially available from morganite and that used had a fibre length 6mm.

The clutch facings produced, when run against a cast iron counterface on a small scale friction and wear testing machine, showed lower wear rates and higher coefficients of friction than similar materials containing asbestos.

The coefficients of friction determined were in the range 0.3 to 0.4 in a 203.2 mm × 146.05 mm coil spring clutch against a cast iron flywheel and pressure plate.

EXAMPLE 4

An annular clutch facing, 203.2 mm outside diameter, was manufactured by the slurry technique mentioned above from the formulation given in Table II below.

TABLE II

| Ingredient | Parts by volume |
| --- | --- |
| Nitrile rubber latex | 20 |
| Phenol-formaldehyde resin | 20 |
| Milled glass fibres (190μ nominal length 9–13μ diam.) | 30 |
| Wood pulp | 10 |
| China clay | 10 |
| Sulphur | 1 |
| Bentonite | 2 |
| Ground rubber crumb | 6 |

The clutch facings so produced had a burst strength of 11,000 to 11,500 rpm at ambient temperature and 6,750 to 8,000 rpm at 200° C., (Burst strength is measured by rotating the clutch facing about its axis at increasing rpm until it breaks through centrifugal force), and a cross breaking strength of 75,842 KN/m² to 82,737 KN/m² (cross breaking strength is measured by placing a sample of the facing on two supports 25.4 mm apart, and then measuring the load required midway between the supports to break the facing).

EXAMPLE 5

An annular clutch facing 152.4 mm outside diameter was manufactured by the slurry technique from the formulation given in Table III.

TABLE III

| Ingredient | Parts by volume |
| --- | --- |
| Nitrile rubber latex | 3.25 |
| Phenol-formaldehyde resin | 15 |
| 3mm long chopped strand glass fibre (304 tex) | 25 |
| Wood pulpo | 10 |
| Whiting | 21.25 |
| Brass | 3 |

The facings so produced had a burst strength of 10,000 to 12,500 rpm at ambient temperature, and 7,000 to 7,500 rpm at 200° C.

EXAMPLE 6

An annular clutch facing of 203.2 mm outsie diameter was manufactured by the slurry technique from the formulation given in Table IV.

TABLE IV

| Ingredient | Parts by volume |
| --- | --- |
| Phenol-formaldehyde resin | 26 |
| Milled glass fibre (190μ nominal length, 9–12μ diameter | 30 |
| Wood pulp | 10 |
| Friction dust | 17 |
| Antimony trisulphide | 2 |
| Brass | 3 |
| Whiting | 9 |
| Sulphur | 3 |

The facings so produced had a burst strength of 11,000 to 11,500 rpm at ambient temperature and 9,250 to 9,750 rpm at 200° C., and a cross breaking strength of 82,737 KN/m².

What I claim is:

1. A friction material composition suitable for the manufacture of friction materials by a slurry technique which comprises a thermosetting binder, a fibrous reinforcement together with other fillers and additives, wherein:
   (a) the thermosetting binder constitutes 15% to 40% by volume of the composition and comprises a phenol-formaldehyde resin, a heat and chemical resistant rubber or a mixture thereof;
   (b) the fibrous reinforcement constitutes 70% to 33% by volume of the material and consists essentially of a mixture of:
      (i) at least one non-asbestos inorganic fibrous material selected from the group consisting of glass fiber, mineral fibers manufactured from slags or naturally occurring rocks, silica fibers and ceramic fibers of the aluminosilicate type, and
      (ii) 3% to 20% by volume of a synthetic organic fiber or an opened natural organic fiber;
   (c) the balance of the composition consisting essentially or selected from the group consisting of inorganic filler, friction and wear modifiers and mixture thereof.

2. A friction material according to claim 1 in which the fibrous reinforcement constitutes about 33% to 50% by volume of the friction material.

3. A friction material according to claim 1 or 2 in which the amount of inorganic fibrous material is in the range 20 to 40% by volume of the material.

4. A friction material according to claim 1 or 2 in which the inorganic fibrous material is in the form of glass fibre.

5. A friction material according to claim 1 in which the organic fibrous material comprises short lengths of fibre and is a natural fibre.

6. A friction material according to claim 5 in which the fibre comprises wood pulp, jute, sisal or cotton.

7. A friction material according to claim 1 in which said rubber is nitrile rubber.

8. A friction material according to claim 1 or 2 which comprises at least one inorganic particulate filler.

9. A friction material according to claim 1 or 2 which includes one or more friction or wear modifiers selected from graphite, molybdenum disulphide, antimony trisulphide and copper, zinc, brass and aluminium.

10. A clutch facing comprising a friction material as claimed in claim 1.

11. A friction material according to claim 1 in which the phenol-formaldehyde resin constitutes at least half of the binder by volume.

12. A clutch facing manufactured by the slurry technique from a friction material composition comprising, in percent by volume:
   (1) from 15% to 40% of a thermosetting binder composed of a ¬heno-formaldehyde resin or a phenol-formaldehyde resin admixed with a heat and chemical resistant nitrile rubber latex;
   (2) from 70% to 33% of an asbestos free fibrous reinforcement consisting essentially of a mixture of:
      (a) short lengths of glass fiber in the form of milled glass fibers, chopped strand glass or mixtures thereof as the main inorganic reinforcement of the friction material, the inorganic fibers constituting 20% to 40% by volume of the material, (b) from 3% to 20% of the composition of short lengths of organic opened fiber sufficient to convey green strength to the friction material during production;

(3) the balance of the composition constituted by at least one of inorganic fillers, friction modifiers and wear modifiers.

13. A clutch facing according to claim 12 wherein said organic opened fiber is cellulose wood pulp.

14. A clutch facing according to claim 12 said thermosetting binder is a mixture of nitrile rubber latex and a phenol-formaldehyde resin constituting at least half the volume of said binder.

* * * * *

UNITED STATES PATENT AND TRADEMARK OFFICE
CERTIFICATE OF CORRECTION

PATENT NO. : 4,197,223
DATED : April 8, 1980
INVENTOR(S) : David Trevor BARTRAM

It is certified that error appears in the above-identified patent and that said Letters Patent are hereby corrected as shown below:

In the specification, Claim 1, clause c, the wording should read--consisting essentially of material selected from-- instead of "consisting essentially or selected from".

Signed and Sealed this

Twenty-sixth Day of August 1980

[SEAL]

Attest:

SIDNEY A. DIAMOND

Attesting Officer    Commissioner of Patents and Trademarks